United States Patent [19]

Wong et al.

[11] Patent Number: 4,638,666
[45] Date of Patent: Jan. 27, 1987

[54] MOVABLE GAUGE HOUSING

[75] Inventors: John K. Y. Wong; Simon K. Y. Wong, both of Tainan Hsien, Taiwan

[73] Assignee: Lumen Electronics Corporation, Tainan Hsien, Taiwan

[21] Appl. No.: 800,511

[22] Filed: Nov. 20, 1985

[51] Int. Cl.$^4$ .......................................... G01D 11/24
[52] U.S. Cl. ..................................................... 73/431
[58] Field of Search .......................... 73/431, 432 AD; 116/284, 306, 309, 311, 312, 313; D10/102; 248/27.3, 27.1, 221.3; 362/23, 269; 403/57, 122

[56] References Cited

U.S. PATENT DOCUMENTS

| Re. 17,545 | 12/1929 | Nenzel | 362/269 |
|---|---|---|---|
| Re. 24,258 | 12/1956 | Burliuk et al. | 362/269 |
| D. 223,404 | 4/1972 | Schwartz | D10/102 |
| D. 274,505 | 7/1984 | Westberg | D10/102 |
| 1,878,035 | 9/1932 | Vickery | 116/300 |
| 2,924,495 | 2/1960 | Haines | 312/251 |
| 2,966,257 | 12/1960 | Littlejohn | 206/45.13 |
| 3,026,072 | 3/1962 | Hughes | 244/148 |
| 3,093,002 | 6/1963 | Logan et al. | 73/431 |
| 3,438,260 | 4/1969 | Kowal et al. | 73/420 |
| 3,594,911 | 7/1971 | Sherman et al. | 73/431 |
| 3,724,277 | 4/1973 | Parmentier | 73/431 |
| 3,768,314 | 10/1973 | Metzler et al. | 73/432 AD |
| 3,829,599 | 8/1975 | Fujioka | 174/48 |
| 3,871,606 | 3/1975 | Larson et al. | 248/27 |
| 3,981,201 | 9/1976 | Jeannet et al. | 73/431 |
| 4,111,570 | 9/1978 | Morel | 403/18 |
| 4,207,768 | 6/1980 | Henss | 73/431 |
| 4,348,899 | 9/1982 | Muller | 73/431 |

FOREIGN PATENT DOCUMENTS

| 0902574 | 6/1972 | Canada | 240/41.6 |
|---|---|---|---|
| 2538083 | 10/1977 | Fed. Rep. of Germany | 248/27.3 |
| 1438753 | 6/1976 | United Kingdom | 73/431 |

OTHER PUBLICATIONS

P. Grafstein and O. Schwarz, *Pictorial Handbook of Technical Devices*, pp. 16-17 (1971).

Primary Examiner—Stewart J. Levy
Assistant Examiner—Robert R. Raevis
Attorney, Agent, or Firm—Joel J. Hayashida

[57] ABSTRACT

The invention provides an improved automotive accessory gauge housing containing at least one automotive gauge, e.g., ammeter, voltmeter, pressure gauge, tachometer, etc., as desired, in which viewability of the gauges is increased by providing a spherical gauge body which freely revolves within a circular opening in the housing, the opening extending through to the interior of the housing. The gauge body is releasably retained by a plurality of supporting brackets, the supporting brackets being around the periphery of the opening in the interior of the housing. The improved housing can be mounted via brackets or the like above or below the vehicle dashboard in the cab area, or as desired.

16 Claims, 8 Drawing Figures

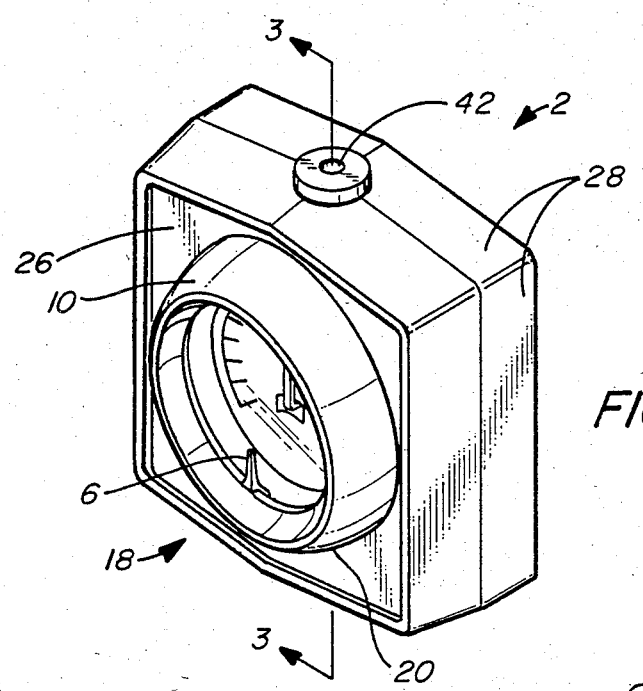
FIG._1.
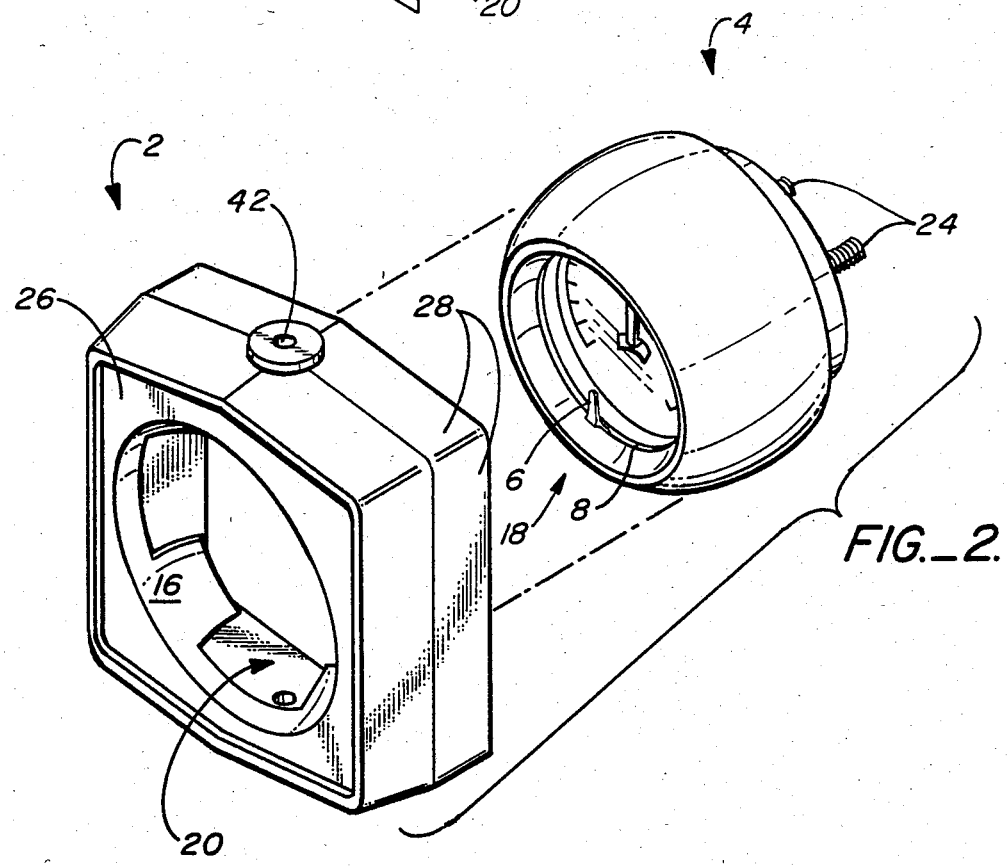
FIG._2.

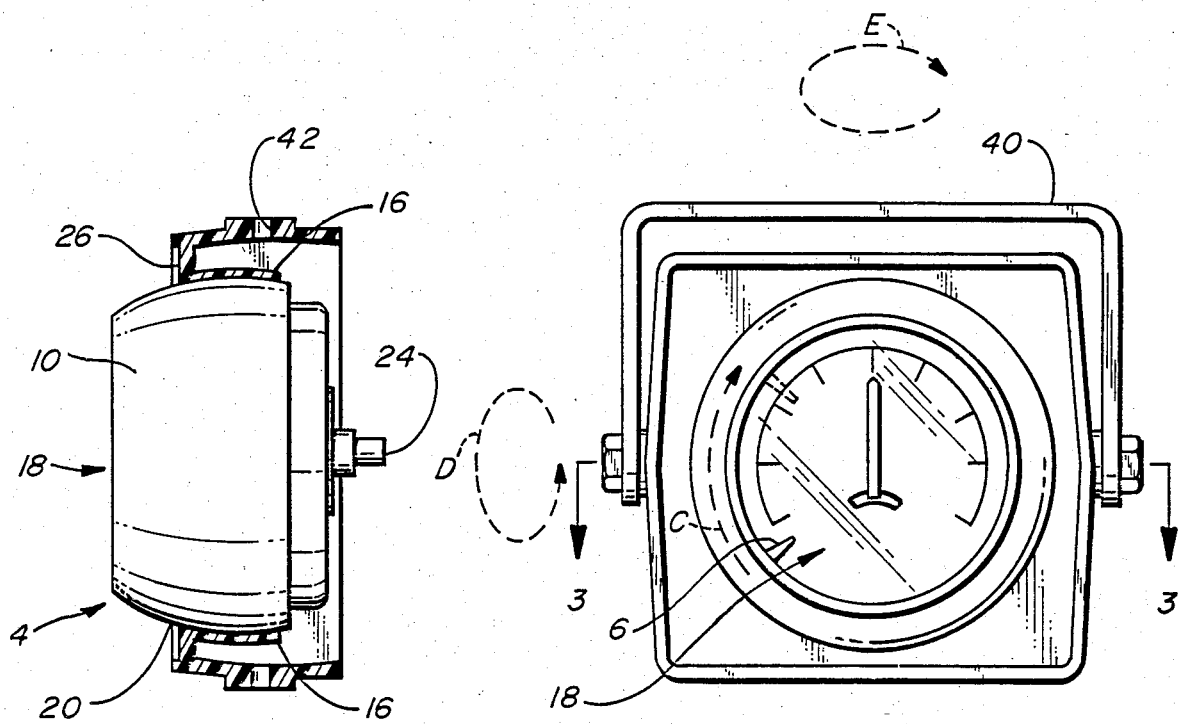
FIG._3.
FIG._5.
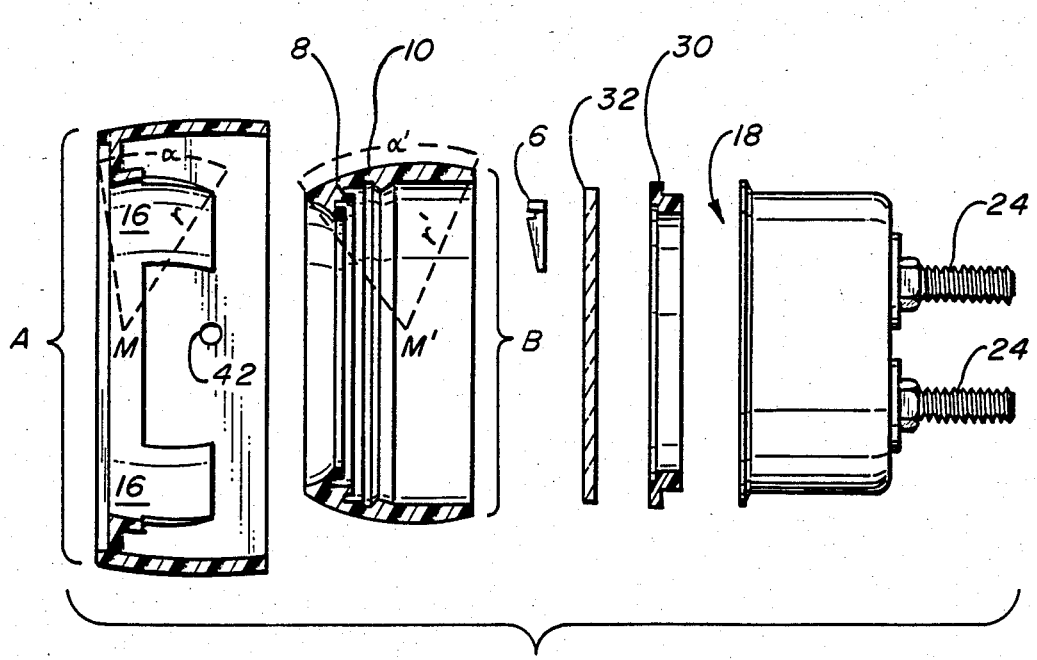
FIG._4.

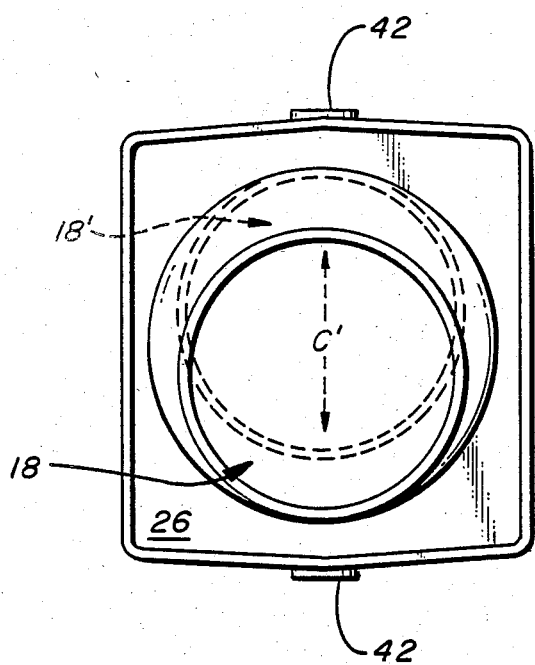
FIG._6.
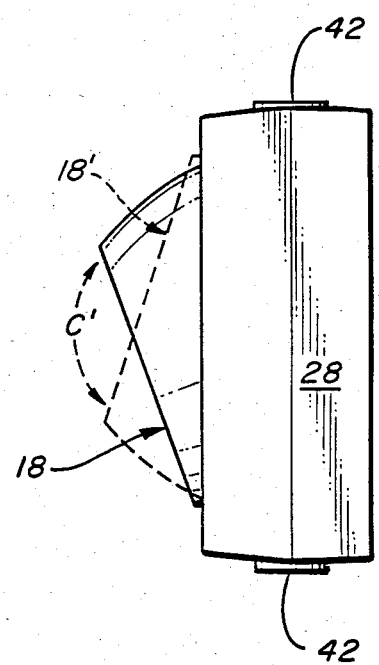
FIG._7.
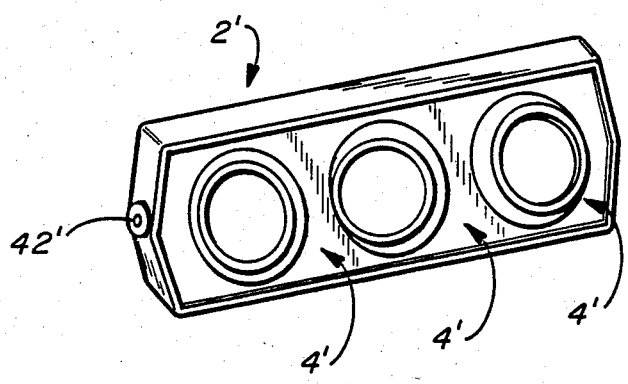
FIG._8.

MOVABLE GAUGE HOUSING

BACKGROUND OF THE INVENTION

1. Field of the Invention

The invention relates to gauge housings, particularly automotive gauge housings for installation and display above or below automobile dashboards in the cab portion of the vehicle.

2. BRIEF STATEMENT OF THE PRIOR ART

Gauge housings are well known in the automotive industry and are common accessories purchased by both hobbyists and professional drivers. These gauge housings may typically contain ammeters, voltmeters, pressure gauges, temperature indicators (Celsius and Fahrenheit), clocks, tachometers and other measuring devices. These gauge housings may be releasably or permanently mounted above or below dashboards, typically by providing a bracket or flange with apertures therethrough to allow for metal penetrating screws or other means to secure the housings to the dashboard.

However, while these types of prior art gauge housings have proven to be inexpensive and easy to install, they are limited in the types of adjustment they afford since the housings cannot move. The brackets or mounting means used to secure the housings to or under the dashboard only allow for one to select the location and angle from which he/she wishes to view the gauge face and then to install the housing in such fixed location and angle. Similarly, if mounted atop the dashboard, a long gauge housing can obscure vision to the driver's right (in an American make vehicle) or left (in a British make vehicle). This can be both unesthetic and dangerous.

SUMMARY AND OBJECTS OF THE INVENTION

The invention provides an improved gauge housing for automotive accessory gauges in which viewability of the gauges is increased by providing a spherical gauge body which freely revolves within a circular opening in the housing. The gauge body is releasably retained within the opening by a plurality of supporting brackets in the interior of the housing.

It is therefore an object of this invention to provide a housing gauge containing at least one gauge body with a viewing face in which the gauge body is easily revolvable in order to give maximum viewing adjustability.

It is another object of this invention to provide a housing gauge in which the gauge body can be a single unit and can be readily snapped into the gauge housing and retained therein by the supporting brackets without the need for further screws or fastening means.

It is still another object of this invention to provide a gauge housing in which the gauge body is revolvable within the housing by being engaged within a noncontiguous spherical socket.

It is yet another object of this invention to provide a gauge housing in which the capacity of the engine, circuits, or other performance of the vehicle can be monitored by means of a warning indicator which can be preset on the gauge dial face, in which the driver or viewer can determine whether the capacity has been or will be exceeded, e.g., whether temperature is dangerously high. It is also an object of this invention to provide a gauge housing whose gauge dials can be repositioned without having to also provide swivelable bracket mounts or other mounting means.

BRIEF DESCRIPTION OF THE DRAWINGS

FIG. 1 shows a perspective view of one preferred embodiment of the gauge housing. FIG. 2 shows an exploded view of the gauge housing of FIG. 1 in perspective. FIG. 3 shows a cross section of the view of FIG. 1, taken along lines 2—2.

FIG. 4 shows an exploded view of the gauge housing, partially in section.

FIG. 5. shows a front view of the gauge housing with a mounting bracket, and the warning indicator rotated to a desired set point.

FIG. 6. shows a front elevational view of the gauge housing showing the movement of the gauge body with respect thereto.

FIG. 7. shows a side view of the gauge housing showing the movement of the gauge body with respect thereto.

FIG. 8 shows a triple gauge housing preferred embodiment with rotated gauge bodies, shown in perspective.

DETAILED DESCRIPTION OF THE PREFERRED EMBODIMENTS

As best viewed in FIGS. 1-3, the gauge housing of this invention comprises two main components, namely, a gauge housing 2 and a gauge body 4, which cooperates with said gauge housing.

The gauge housing 2, as shown in this preferred embodiment, is a hollow, hexahedronically shaped body, with a front, housing face 18 containing a circular opening 20 which extends through the gauge housing into the interior thereof. The housing face is coextant with a housing front wall 26 and housing side walls 28 which define the remainder of the housing 2. In the interior of the housing 2, a plurality of support members 16 ring the backside of the opening 20 set in an interior wall (not shown) which is the back of front wall 26. The support members 16 are usually brackets and when the gauge body 4 is spherical, the support brackets 16 are usually concave and follow the spherical configuration of the gauge body 4 in order to best conform and retain the spherical gauge body 4.

When the support members 16 are brackets and concave with respect to the opening 20, the brackets 16 and the opening 20 form a "semi-socket" into which the spherical gauge body nests and revolves.

In a preferred embodiment, the spherical gauge body 4 will have a defined diameter (e.g., about ½ inch to 4 inches) and the concave brackets will have a diameter of slightly greater than the gauge body but sufficient to retain and conform to said gauge body but allow free revolution within.

In a further embodiment, the semi-socket as formed by the concave brackets 16 and opening 20 may also be considered to form a noncontiguous spherical socket. Although the invention is not limited to this embodiment only, in the noncontiguous embodiment, the gauge body 4 is afforded greater sphere of movement than if the socket were contiguous. Electrical contacts 24 appear to follow the movement of the gauge body 4 very readily.

The gauge body 4 is preferably spherical in order to gain maximum adjustability within the circular opening 20 of the housing 2. In this preferred embodiment, the gauge body actually defines a transverse section of a sphere, although for the purposes of the invention, the term "sphere" or "spherical" includes such section. The gauge body includes a gauge face 18. As more accurately depicted in FIG. 4, an exploded view, the gauge body is preferably constructed from a spherical portion 10, which includes in its interior an inner groove or track 8, into which can be snapped or placed a warning indicator 6.

A gauge face 18 is thus combined with dial cover 30 and a glass or plastic transparent lens 32. These are combined with the spherical portion 10 (which also acts as a bezel to retain the dial cover 30 and lens 32) to form the gauge body 4. Wiring contacts 24 communicate with with standard electrical leads to the motor or element being monitored. Said contacts 24 need not be electrical contacts, e.g., in the case of a temperature probe, which could include a thermocouple.

In order to assemble the gauge body 4 and housing 2 to form the inventive gauge housing, the spherical surface 10 of the gauge body 4 is inserted into the interior and back portion of the housing 2, by pushing the gauge body 4 past the support brackets 16, which will yield under stress but resume their original positions and retain the gauge body 4 in position within the opening 20. Thus, the gauge body 4 can be constructed as a unit. Assembly with the housing 2 is accomplished merely by snapping the gauge body into engagement with the support members 16 of housing 2. Since the gauge body 4 can thus be releasably retained within housing 2 via support brackets 16, the inventive gauge housing is advantageous and cost-effective as each component can be molded, extruded, etc., individually and replaced as desired with other modular components similarly constructed. Thus, ammeters can be replaced with temperature gauges, etc.

However, because the circumference of the spherical configuration B of the gauge body will be preferably larger than the circumference A (best depicted in FIG. 4) of the opening 20, the gauge body is securely but movably retained within the housing. This is a further advantage of the inventive gauge housing in that there is no need for external screw-threaded plates or latching devices to retain or secure the gauge body within the housing 2. For example, in a nonanalogous area, the movement of a ball and socket joint may be restricted by use of latching means. (See, U.S. Pat. No. 4,111,570, issued to Morel, Sept. 5, 1978).

In a best mode embodiment, the concave support brackets 16 will, as indicated in FIG. 4, have a certain diameter, d, e g , 2 inches (determined by defining the radius, r, from a midpoint, M, and d=2r, r being 1 inch) and an arc, $\alpha$, of about 40°. The spherical gauge body 2, which has a spherical portion 10 which will have a diameter, d' slightly greater than the diameter, d, of the support brackets 16 such that support brackets 16 retain and conform to the gauge body 4 snugly yet allow for free movement within the opening 20 of the housing 2. Free movement would be herein defined to mean movement within 360°, up and down movement, side to side and a combination of these movements. Because the support brackets have a concave curvature, they will constantly urge the gauge body 4 frontwards but because gauge body 4 has a circumference B larger than the circumference A of the opening 20, the gauge body 4 is prevented from being urged out of the opening 20. Yet because diameter of the gauge body 4 is only slightly larger than the diameter of the support brackets 16, the fitting engagement between the gauge body 4 and the support brackets is snug but allows for easy movement of the gauge body therewithin because the articulating surfaces will preferably be smooth. The support brackets 16 thus capture and support the gauge body 4 such that the gauge body 4 can be moved in any direction to allow greatest adjustability in viewing angle of the gauge face 18, without having to reposition the entire gauge body by removing the mounting bracket or other means used to secure the gauge body to the desired surface, e.g., a car dashboard.

FIG. 5 also shows by the direction C the revolution of the gauge body 4 within the opening 20 so that the gauge face 18 could be viewed from an angle which is below the surface on which the gauge housing would be mounted, if the surface is a dashboard. Thus, those of shorter stature could view the gauge face 18 from a comfortable angle. The gauge body 4 could also be moved in a direction opposite C.

FIGS. 6 and 7 depict the front and side elevational views of the inventive gauge housing, showing further movements of the gauge body. FIG. 6 shows the movement C' of the gauge body 4 within the opening 20 from an original position noted by scored lines 18', in which the gauge face 18 had been initially. Thus, gauge body 4 (and gauge 18) has been adjusted downward. FIG. 7 corresponds to the view shown in FIG. 6 but from a side elevational view.

FIGS. 1–3, 5–8 show that apertures 42 can be drilled or perforated or formed in the gauge housing 2 to mount the gauge housing 2 with mounting means, e.g., brackets or other structures onto surfaces such as vehicle dashboards or the like. The apertures 42 are shown to be formed within slightly raised surfaces which may result from the molds or other forms used to manufacture the gauge housing 2 but such raised surfaces are not limiting to the invention.

Additionally, FIG. 5 shows that it is also advantageous to add a swivel or hinge to the mounting means to allow movement in yet other directions. For example, direction D describes the movement of the gauge housing in an arc perpendicular to the surface to which the gauge is attached, e.g., where the gauge housing is swivel- or hinge-mounted. Direction E shows the movement of the gauge housing in an arc which is parallel to the surface to which the gauge is attached, e.g., where the mounting means has a base which contains a swivel.

The gauge body 4 and the support brackets 16 and the rest of the housing 2 should preferably be constructed of a rigid but slightly deformable plastic, i.e., the brackets 16 will yield just enough to allow the gauge body 4 to be snapped in place in the opening 20, but said brackets will immediately resume their original configuration and conform tightly to the gauge body 4. Suitable plastics include high density polyethylene, low density polyethylene, polypropylene, poly(vinyl chloride), polystyrene, polyurethane, polyisocyanurates, phenolic resins, amino resins, and preferably polycarbonates and acrylonitrile-butadiene-styrene (ABS) resins. ABS resins are standard in the industry and are typically tough and rigid, easy to extrude or mold, and have good thermal and abrasion resistance. They are also widely available from a large number of manufacturers and are inexpensive. Polycarbonates possess a wide number of desirable characteristics such as high strength, easy processing by extrusion or injection molding and good fire resistance; however, these particular plastics are also somewhat more expensive. Other desirable, deformable plastics which are durable and tend to hold their original configuration are detailed in *Kirk-Othmer, Encyclopedia of Chemical Technology*, 3rd Ed., Vol. 18, pages 87-108 (1982), the disclosure of which is incorporated herein by reference.

The warning indicator 6 can be rotated within the gauge face by moving it within the inner track 8 as desired. The purpose of this warning indicator 6 is best depicted with respect to an example wherein the gauge is a temperature indicator. In order to monitor the internal engine temperature, the warning indicator 6 is rotated to a preset position at certain point on the dial face 28 which indicates a critical temperature (in degrees Celsius or Fahrenheit) which should not be exceeded.

The gauge housing of this invention can be mounted by suitable mounting means, such as brackets provided with apertures through the base for accepting metal penetrating screws, etc. In a further embodiment of this invention, it may be desirable to use movable mounting brackets, i.e., ones which include swivels or hinges or other means to adjust the gauge housing such that it could be viewed in a variety of different angles. These swivel or hinge-mounted brackets can, with proper adjustment and care taken to avoid obstruction of vision, can be desirable adjuncts to the gauge housings of this invention as they can increase the number of viewing angles in which the gauge housing can be viewed.

Further, the gauge housing of the present invention is not limited to a single gauge embodiment. FIG. 8 of the drawings shows a triple gauge embodiment, in which the gauges can desirably include a temperature gauge, an oil pressure gauge and an ammeter. Note gauge bodies 4' are positioned in different viewing angles as desired.

Yet another possible embodiment would be to modify the support members 16 into a concave, cup-like structure, which could have an inlet apperture to allow communication with electrical contacts. This would also be another example of a noncontiguous sphere. The cup-like embodiment could be enabled by manufacturing the housing 2 as two separate top and bottom halves, placing the gauge body therebetween, and gluing or securing the halves together.

Although the above description and drawings and the claims which follow hereto, describe a gauge housing useful as an automotive accessory, in fact, this invention is not limited thereto and obvious equivalents and alternate embodiments consistent with the scope and content of this application are included therein.

We claim:

1. An automotive gauge housing providing a viewing surface with one or more openings therein for retention and movement of one or more gauges comprising:
    (a) a housing with at least one circular opening extending through the interior of said housing, said opening framed therewithin by a plurality of concave supporting members; and
    (b) at least one spherical gauge body having a gauge face; wherein said supporting members conform to and retain said gauge body while allowing said said gauge body to be freely revolvable within said housing.

2. The gauge housing of claim 1 wherein said gauge body is provided with a gauge face, in the interior of which is provided a retaining groove.

3. The gauge housing of claim 2 wherein said retaining groove includes a movable warning indicator, said indicator's movements being limited to lateral rotation in said retaining groove.

4. The gauge housing of claim 1 wherein said supporting members includes a plurality of supporting brackets.

5. The gauge housing of claim 4 wherein said supporting brackets urge said gauge body frontward upon said opening.

6. The gauge housing of claim 1 wherein said gauge body is releasably retained by said supporting members.

7. The gauge housing of claim 1 further comprising an external mounting bracket for securing said gauge housing to a surface.

8. The gauge housing of claim 7 wherein said mounting bracket includes a means to allow said gauge housing to move about an axis which is parallel to said surface.

9. The gauge housing of claim 7 wherein said mounting bracket includes a means to allow the gauge housing to move about an axis which is perpendicular to said surface.

10. The gauge housing of claim 1 wherein said supporting members are brackets and are concave in shape in order to urge said gauge body against said opening.

11. The gauge housing of claim 10 wherein said gauge body and said brackets are made of rigid but deformable plastic.

12. The gauge housing of claim 1 wherein said gauge housing includes a plurality of gauge faces retained within a plurality of openings.

13. The gauge housing of claim 1 wherein said supporting members releasably retain said gauge body.

14. A vehicular accessory gauge in which at least one gauge face can be revolvably adjusted so as to provide optimum viewability of said gauge face and to prevent obstruction of a viewer's lateral vision, said gauge comprising:
    (a) a hollow gauge housing with a least one circular opening therethrough, the interior of said gauge housing having a plurality of concave support members surrounding the opening; and
    (b) at least one spherical gauge body with a gauge face in the front thereof, said gauge body retained within said opening by said support members urging the back of said gauge body frontwards, said gauge face adjustably visible through said gauge, wherein said circumference of said gauge body is larger than the circumference of said opening.

15. The gauge housing of claim 14 wherein said gauge body is releasably retained by said support members.

16. A method for increasing the viewing angle of gauge housings, comprising the steps of:
    (a) forming a gauge housing including a front housing face Provided with a circular opening extending into the interior of the housing, said interior including concave supporting means around the periphery of said opening;
    (b) supporting within the interior of said gauge housing a spherical gauge body which freely moves within the interior and opening of said gauge housing; and
    (c) urging said gauge body frontwards by said supporting means while retaining said gauge body within said opening of said gauge housing so as to allow adjustable viewing of a portion of the gauge body;
    the retention of said gauge body being effected by making the circumference of said gauge body slightly larger than the circumference of said opening.

* * * * *